United States Patent
Iwaasa

(10) Patent No.: US 7,738,246 B2
(45) Date of Patent: Jun. 15, 2010

(54) RECORDING AND REPRODUCING APPARATUS

(75) Inventor: Hiroaki Iwaasa, Daito (JP)

(73) Assignee: Funai Electric Co., Ltd. (JP)

( * ) Notice: Subject to any disclaimer, the term of this patent is extended or adjusted under 35 U.S.C. 154(b) by 61 days.

(21) Appl. No.: 12/003,882

(22) Filed: Jan. 3, 2008

(65) Prior Publication Data

US 2008/0165491 A1    Jul. 10, 2008

(30) Foreign Application Priority Data

Jan. 9, 2007    (JP) .............................. 2007-000939

(51) Int. Cl.
    *H05K 7/14* (2006.01)
(52) U.S. Cl. .............................. 361/679.33; 361/679.34; 312/223.2
(58) Field of Classification Search ............ 361/679.34, 361/679.35, 679.02; 312/223.2
    See application file for complete search history.

(56) References Cited

U.S. PATENT DOCUMENTS

| | | | |
|---|---|---|---|
| 6,138,966 A * | 10/2000 | Smith | 248/176.1 |
| 6,512,671 B1 * | 1/2003 | Okano et al. | 361/679.4 |
| 2003/0179544 A1 * | 9/2003 | Bruner et al. | 361/685 |
| 2003/0206397 A1 * | 11/2003 | Allgeyer et al. | 361/685 |
| 2006/0067043 A1 | 3/2006 | Kotani et al. | |

FOREIGN PATENT DOCUMENTS

JP    2003-314613    11/2003

* cited by examiner

*Primary Examiner*—Jayprakash N Gandhi
*Assistant Examiner*—Ingrid Wright
(74) *Attorney, Agent, or Firm*—Bacon & Thomas, PLLC

(57) ABSTRACT

A twist is added to an HDD holder so that the vibration of an HDD unit can be attenuated more reliably not to have any impact on a main body chassis and a VCR unit. There is provided a recording and reproducing apparatus including an HDD unit 40 and a VCR unit and having a structure in which the HDD unit 40 is mounted on an HDD holder 70 via dampers 61a and 61b and the HDD holder 70 is mounted on a main body chassis, wherein the HDD holder 70 is formed of a resin member and includes a placing plate 71 for placing and fixing the HDD unit 40 thereon and four leg pieces 72 and 73 provided in an extending manner downward from the corners of the placing plate 71, the HDD unit 40 being held in a slightly floating manner over the placing plate 71 by the dampers 61a and 61b.

7 Claims, 3 Drawing Sheets

RECORDING AND REPRODUCING APPARATUS

BACKGROUND OF THE INVENTION

1. Field of the Invention

The present invention relates to recording and reproducing apparatuses having a structure in which a hard disk drive (HDD) unit is mounted on an HDD holder via a shock-absorbing member and the HDD holder is mounted on a main body chassis.

2. Description of the Related Art

In conventional hybrid recording and reproducing apparatuses in which an HDD unit, a videocassette recorder (VCR) unit, and a DVD (Digital Versatile Disk) unit are mounted on a main body chassis, all of these units are mounted directly on the main body chassis.

FIG. 3 shows a state where an HDD unit, a DVD unit, and a VCR unit are mounted on a main body chassis.

That is, a vertically standing front panel 11 is arranged on the front side of a main body chassis 10, the front panel 11 being provided with a disk insertion opening 12 for loading an optical disk (DVD) therethrough and a cassette insertion opening 13 for loading a videocassette therethrough. Then, a VCR unit 20 including a tuner section 20a and other sections is arranged in such a manner as to face the cassette insertion opening 13, a DVD unit 30 is arranged in such a manner as to face the disk insertion opening 12, and an HDD unit 40 is arranged in rear of the DVD unit 30. That is, the DVD unit 30 and the HDD unit 40 are arranged side by side next to the VCR unit 20 that requires the largest space.

Then, the HDD unit 40 is to be mounted on an HDD holder 50 formed through sheet metal processing, as shown in FIGS. 4(a) and 4(b), and the HDD holder 50 is to be mounted and fixed onto the main body chassis 10.

The HDD holder 50 includes a placing plate 51 for placing and fixing the HDD unit 40 thereon, and a pair of left and right leg pieces 52 and 53 is suspended downward from the front end portion of the placing plate 51 and further the lower end portions of the leg pieces are folded forward at about 90 degrees to form fixation pieces 52a and 53a for fixation to the main body chassis 10. Also, the rear end portion of the placing plate 51 stands vertically to form a backside fixation plate 54 for fixation to a backside plate 14 formed on the back side of the main body chassis 10.

Screw insertion holes 55, 55, . . . are formed in the fixation pieces 52a and 53a and the backside fixation plate 54, and screw holes (not shown in the drawings) are formed correspondingly in the bottom panel of the main body chassis 10 and the backside plate 14. Then, the HDD holder 50 is to be fixed to the main body chassis 10 by inserting screw members (not shown in the drawings) into the respective screw holes formed in the bottom panel of the main body chassis 10 and the backside plate 14 through the respective screw insertion holes 55, 55, . . . formed in the fixation pieces 52a and 53a and the backside fixation plate 54.

On the other hand, attachment pieces 41 and 41 for attaching the HDD unit 40 to the placing plate 51 of the HDD holder 50 are formed in a horizontally extending manner, respectively, from the front and rear lower end portions of the HDD unit 40, and the attachment pieces 41 and 41 each have two approximately U-shaped screw fitting notched portions 43 and 43 (i.e. four portions in total) formed on the left and right sides thereof. Also, screw holes 56, 56, . . . are formed at positions in the placing plate 51 that correspond to the positions of the screw fitting notched portions 43, 43, . . . .

Then, as shown in FIG. 4(b), lower dampers 61b, 61b, . . . each formed of a cylindrical rubber elastic member (shock-absorbing member) are disposed on the screw holes 56, 56, . . . , the attachment pieces 41 and 41 of the HDD unit 40 are placed on the dampers 61b, 61b, . . . in such a manner that the screw fitting notched portions 43, 43, . . . are aligned with the respective dampers, and upper dampers 61a, 61a, . . . each formed of a cylindrical rubber elastic member (shock-absorbing member) are further disposed on the attachment pieces. In this state, the periphery of each screw fitting notched portion 43 in both the attachment pieces 41 and 41 is to be fixed between each upper damper 61a and lower damper 61b by inserting screw members 62, 62, . . . from above into the screw holes 56, 56, . . . .

However, in actual mounting operations, each upper damper 61a and lower damper 61b are fitted preliminarily on each screw member 62, and the screw members 62 are fitted temporarily to the attachment pieces 41 of the HDD unit 40 in such a manner that each screw fitting notched portion 43 in the attachment pieces 41 is inserted into the clearance between each upper damper 61a and lower damper 61b, as shown in FIG. 4(a). In this state, the HDD unit 40 is disposed on the placing plate 51 of the HDD holder 50 and then fixed to the HDD holder 50 by inserting the screw members 62 into the corresponding screw holes 56.

That is, the HDD unit 40 is designed to be held in a slightly floating manner over the placing plate 51 by the lower dampers 61b so that the vibration of the HDD unit 40 itself cannot be transmitted directly to the HDD holder 50 and the main body chassis 10 with the HDD holder 50 mounted thereon and therefore the DVD unit 30 and VCR unit 20 mounted on the main body chassis 10.

Such a structure of mounting an HDD unit on an HDD holder via an elastic member is disclosed in, for example, Japanese Patent Laid-Open Publication Nos. 2006-092703 and 2003-314613, though different from the configuration shown in FIG. 4. Japanese Patent Laid-Open Publication Nos. 2006-092703 and 2003-314613 each disclose a structure of mounting an HDD unit on an HDD holder formed through sheet metal processing via a rubber elastic member.

In accordance with the foregoing conventional art, vibrations generated in the HDD unit 40 can be attenuated by the upper and lower dampers 61a and 61b to some degree. However, conventional apparatuses, in which the HDD holder 50 itself is formed through sheet metal processing, suffer from a problem in that vibrations that cannot be absorbed completely by the upper and lower dampers 61a and 61b may be transmitted through the metal plate HDD holder 50 with no attenuation to the main body chassis 10 and therefore the DVD unit 30 and VCR unit 20 mounted on the main body chassis 10. In particular, apparatuses equipped with a VCR unit 20 suffer from a problem in that such vibrations have a subtle impact on the magnetic head mounted on the rotating drum of the VCR unit 20, resulting in a deterioration in the performance of the VCR. That is, there is a possibility of occurrence of faulty recording due to tracking errors during recording and/or distortion of images due to tracking errors during reproduction, etc.

SUMMARY OF THE INVENTION

The present invention has been made to solve the above-described problems, and an object thereof is to provide a recording and reproducing apparatus in which a twist is added to an HDD holder so that the vibration of an HDD unit can be attenuated more reliably not to have any impact on a main body chassis and a VCR unit.

In order to achieve the foregoing object, the present invention is directed to a recording and reproducing apparatus including an HDD unit and having a structure in which the HDD unit is mounted on an HDD holder via a shock-absorbing member and the HDD holder is mounted on a main body chassis, wherein the HDD holder is formed of a resin member. The resin member may be made of ABS (acrylonitrile butadiene styrene), a heat resistant resin. Since resins themselves have a function of absorbing vibrations, thus forming the HDD holder itself of a resin member allows the vibration of the HDD unit to be further attenuated relative to conventional metal plate HDD holders.

In the case above, in order to further increase the attenuation rate, the HDD holder may include a placing plate for placing and fixing the HDD unit thereon and leg members provided in an extending manner downward from the corners of the placing plate, the bottom surfaces of the leg members being fixed to the main body chassis. That is, the supportive structure using the leg members allows the vibration of the HDD unit to be further attenuated through the leg members.

The HDD unit may also be held in a floating manner over the placing plate by the shock-absorbing member. Therefore, vibrations and/or heat generated in the HDD unit cannot be transmitted directly to the HDD holder. In addition, making the resin member of ABS, a heat resistant resin, as mentioned above formulates thoroughgoing measures against heat.

Further, second shock-absorbing members may be inserted between the bottom surfaces of the leg members and the main body chassis. Inserting the second shock-absorbing members allows vibrations transmitted to the HDD holder to be further attenuated.

In addition, the recording and reproducing apparatus may further include a DVD unit and/or a VCR unit. That is, the present invention is applied to recording and reproducing apparatuses in which an HDD unit, a DVD unit, and a VCR unit are mounted on one main body chassis. In this case, there has been a problem, as described heretofore, in that the vibration of the HDD unit has a subtle impact on the magnetic head mounted on the rotating drum of the VCR unit, but making the HDD holder of resin as in the present invention allows such a problem to be solved.

In accordance with the present invention, since resins themselves have a function of absorbing vibrations, forming the HDD holder itself of a resin member allows the vibration of the HDD unit to be further attenuated relative to conventional metal plate HDD holders. Thus, if an HDD unit, a DVD unit, and a VCR unit are mounted on one main body chassis, conventional recording and reproducing apparatuses suffer from a problem in that the vibration of the HDD unit is transmitted through the metal plate HDD holder to have a subtle impact on the magnetic head mounted on the rotating drum of the VCR unit, but making the HDD holder of resin allows such a problem to be solved.

In addition, since the resin member has electrical insulating properties, it is easy to provide electrical isolation between the HDD unit and the main body chassis as well as other components mounted on the main body chassis.

DESCRIPTION OF THE PREFERRED EMBODIMENTS

Embodiments of the present invention will hereinafter be described with reference to the accompanying drawings.

Figure 3:
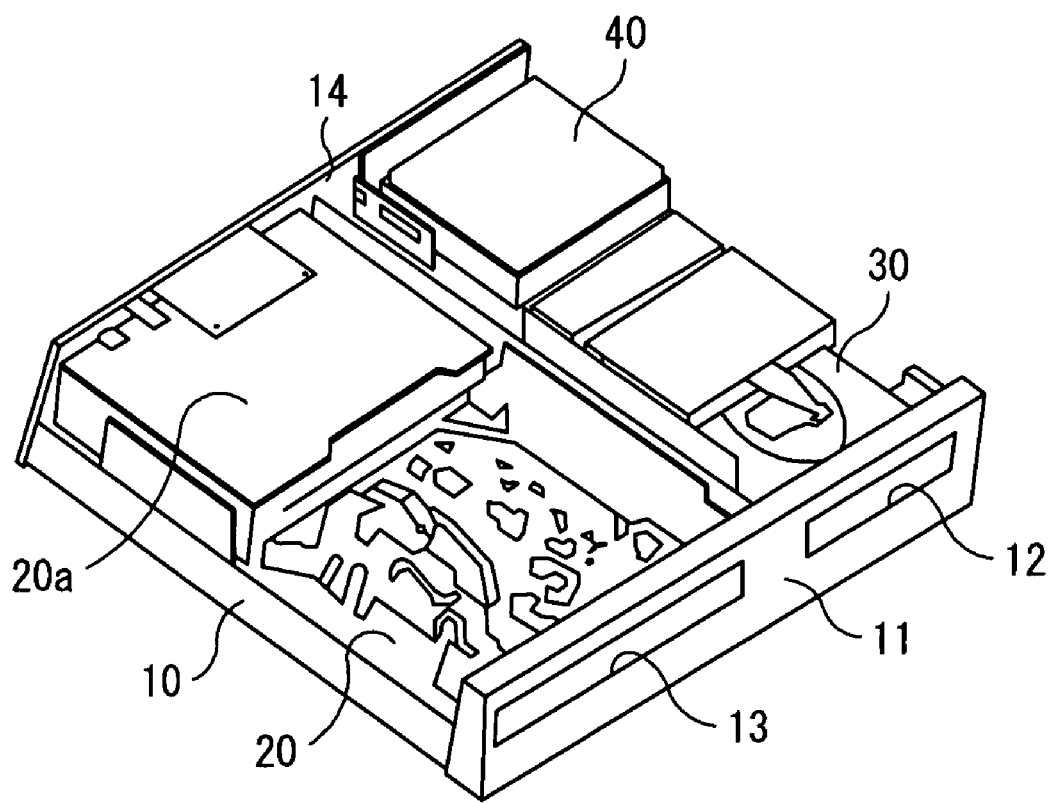
FIG. 3 is a schematic perspective view showing a state where an HDD unit, a DVD unit, and a VCR unit are mounted on a main body chassis.

The recording and reproducing apparatus according to the present embodiment is a hybrid one in which an HDD unit, a VCR unit, and a DVD unit are mounted on a main body chassis, and the state of mounting on the main body chassis is the same as the conventional one shown in FIG. 3. The present embodiment is directed to such a mounting structure, characterized in that the HDD holder is formed of a resin member. In the following descriptions of the HDD holder, the other constructional members are described using the reference numerals designating the conventional constructional members shown in FIG. 3.

Figure 1:
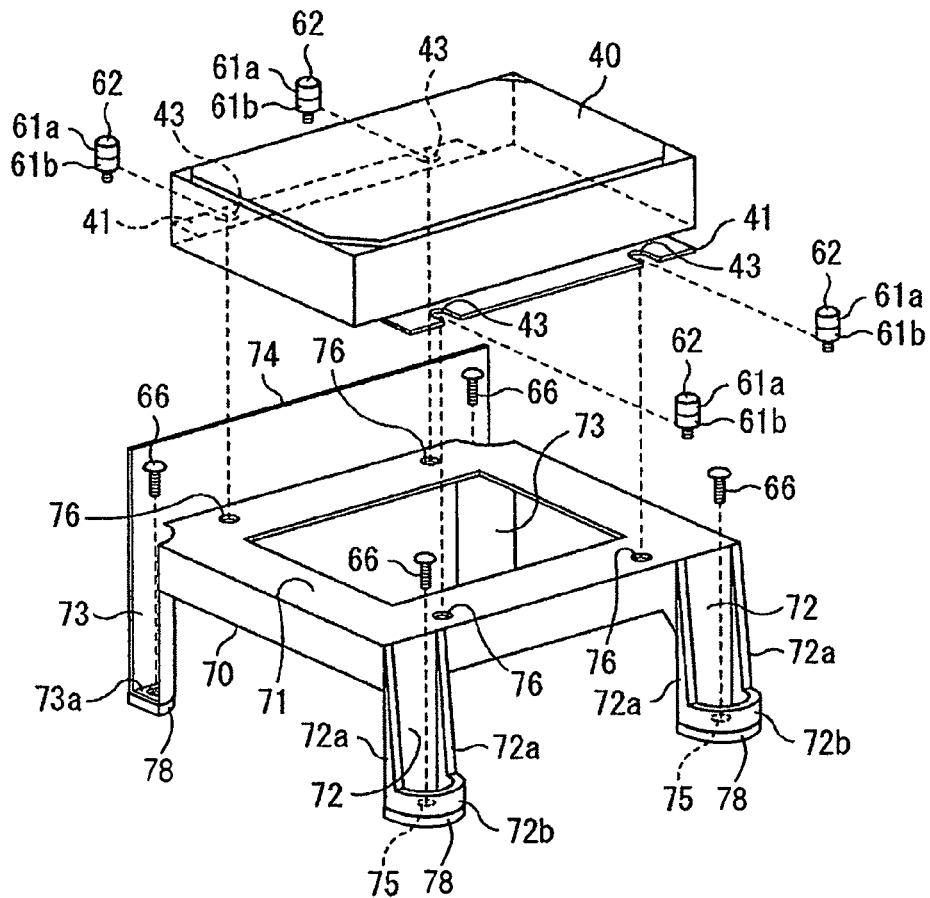
FIG. 1 is an exploded perspective view showing the structure of an HDD holder to be mounted on a recording and reproducing apparatus according to the present invention.
Figure 2:
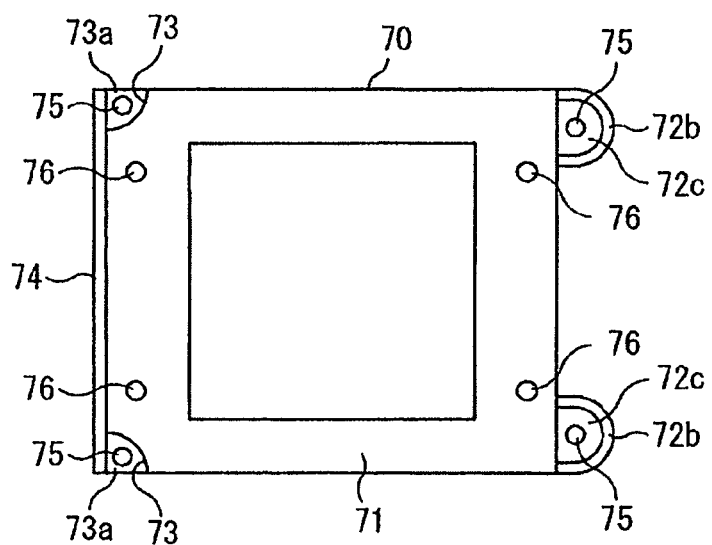
FIG. 2 is a plan view of the HDD holder.

FIG. 1 is an exploded perspective view showing the structure of an HDD holder 70 according to the present embodiment before mounting of an HDD unit 40 thereon, and FIG. 2 is a plan view of the HDD holder 70.

The HDD holder 70 is entirely formed of a resin member as mentioned above, and specifically, of injection-molded ABS, a heat resistant resin.

The HDD holder 70 includes a flat placing plate 71 with an opening at the center thereof for placing and fixing the HDD unit 40, and a pair of left and right front leg pieces 72 and 72 is formed in an extending manner downward from the front end portion of the placing plate 71.

The front leg pieces 72 each have reinforcing ribs 72a suspended downward along the left and right lateral edges thereof and an annular rib 72b extending from the reinforcing ribs 72a at the lower end portion thereof. Then, screw insertion holes 75 for inserting screw members 66 therethrough into screw holes (not shown in the drawings) in the main body chassis 10 are formed in the bottom surfaces 72c of the respective annular ribs 72b. That is, the annular ribs 72b are provided to avoid stress concentration due to fastening with the screw members 66.

Also, a vertically standing backside plate 74 is formed at the rear end portion of the placing plate 71, and a pair of left and right rear leg pieces 73 and 73 is formed in an extending manner downward from the backside plate 74. As shown in FIG. 2, the rear leg pieces 73 are each formed in an approximately U shape opening laterally, such a shape providing strength as a leg piece. Then, screw insertion holes 75 for inserting screw members 66 therethrough into screw holes (not shown in the drawings) in the main body chassis 10 are formed in the bottom surfaces 73a of the respective rear leg pieces 73. That is, the HDD holder 70 according to the present embodiment is to be supported and fixed on the main body chassis 10 by the four leg pieces 72, 72, 73, and 73.

Further, screw holes 76, 76, . . . are formed at positions in the placing plate 71 that correspond to the positions of screw fitting notched portions 43, 43, . . . formed in the attachment pieces 41 and 41 of the HDD unit 40. It is noted that rib pieces are also formed on the periphery of the placing plate 71 so as to connect adjacent leg pieces to strengthen the placing plate 71.

Figure 4A:
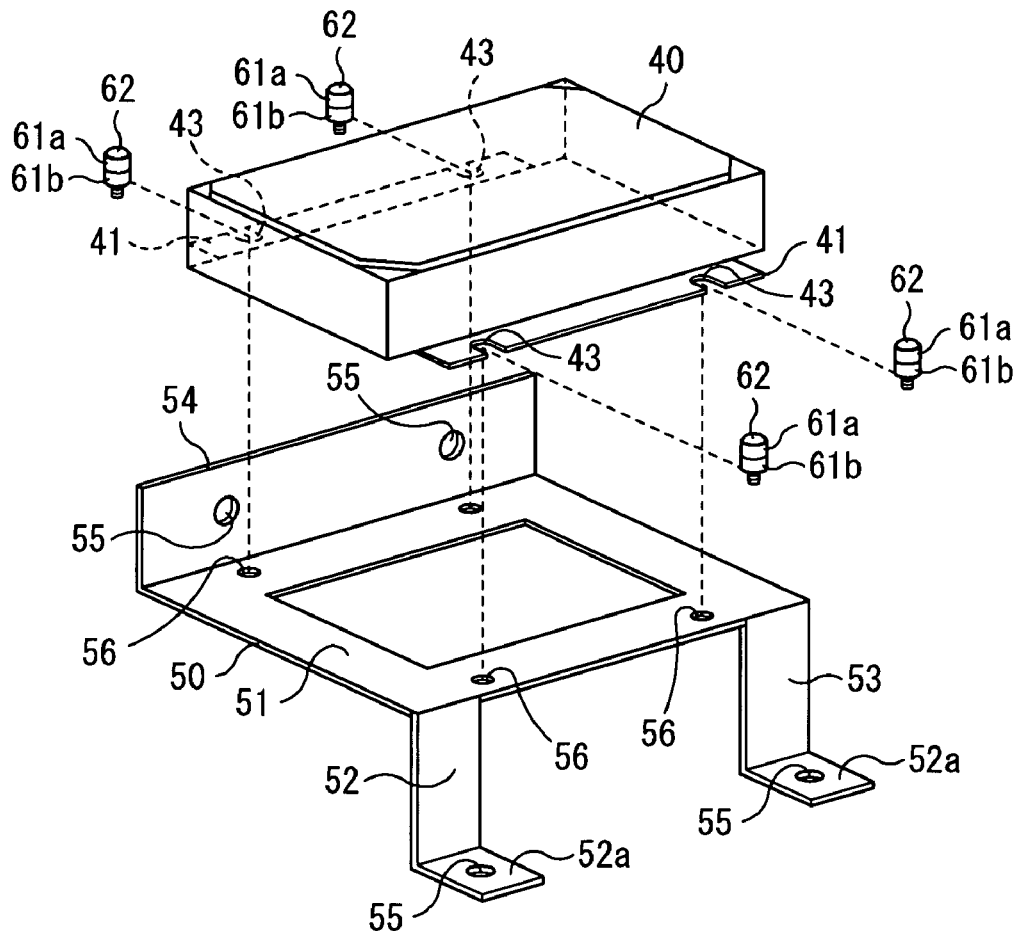
FIG. 4(a) is an exploded perspective view showing the structure of a conventional HDD holder mounted on a main body chassis.
Figure 4B:
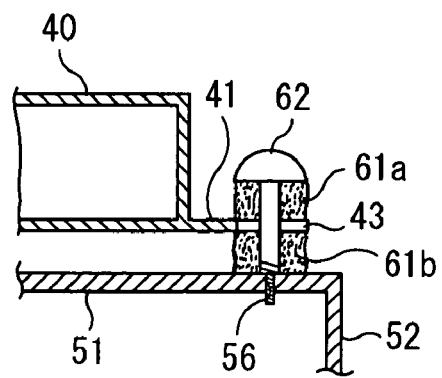
FIG. 4(b) is an enlarged cross-sectional view showing the attachment between the HDD unit and the HDD holder.

The method of mounting the HDD unit 40 on the thus arranged HDD holder 70 is the same as in the above-described conventional art. That is, each upper damper 61a and lower damper 61b are fitted preliminarily on each screw member 62, and the screw members 62 are fitted temporarily to the attachment pieces 41 of the HDD unit 40 in such a manner that each screw fitting notched portion 43 in the attachment pieces 41 of the HDD unit 40 is inserted into the clearance between each upper damper 61a and lower damper 61b. In this state, the HDD unit 40 is disposed on the placing plate 71 of the HDD holder 70 and then fixed to the HDD holder 70 by inserting the screw members 62 into the corresponding screw holes 76. Therefore, the structure of mounting in this case is the same as shown in FIG. 4(b), where the HDD unit 40 is to be held on the HDD holder 70 in a slightly floating manner over the placing plate 71 by the lower dampers 61b, 61b, . . . . That is, the HDD unit 40 is supported and fixed on the HDD holder 70 only by four-point mounting using the four screw members 62. In this case, using shoulder screws as the screw members 62 would prevent the upper and lower dampers 61a and 61b from being compressed unnecessarily when the screw members 62 are inserted into the screw holes 76.

Then, the HDD holder 70 thus holding the HDD unit 40 thereon is fixed to the main body chassis 10 using the screw members 66. That is, the screw insertion holes 75 formed in the bottom surfaces 72c and 73a of the front leg pieces 72 and 72 and the rear leg pieces 73 and 73 are arranged correspondingly to the screw holes (not shown in the drawings) formed in the main body chassis 10, and in this state, the screw members 66 are inserted from above into the screw holes to fix the HDD holder 70 onto the main body chassis 10.

The arrangement above allows the vibration of the HDD unit 40 to be attenuated to some degree by the upper and lower dampers 61a and 61b fitted on the screw members 62, and vibrations transmitted to the HDD holder 70 with no attenuation are to be further attenuated through the front and rear leg pieces 72 and 73. That is, vibrations can be attenuated utilizing the flexibility of resins themselves.

Consequently, the vibration of the HDD unit 40 is to be attenuated mostly before transmitted to the main body chassis 10 and thereby hardly transmitted to the VCR unit 20 mounted on the main body chassis 10.

It is noted that in the above-described embodiment, the bottom surfaces 72c and 73a of the front leg pieces 72 and 72 and the rear leg pieces 73 and 73 are brought into direct contact with the main body chassis 10 when mounting and fixing the HDD holder 70 onto the main body chassis 10, but sheet-like elastic members 78 (second shock-absorbing members) may further be inserted between the bottom surfaces 72c and 73a and the main body chassis 10. Thus, further inserting the sheet-like elastic members allows vibrations transmitted to the HDD holder 70 to be further attenuated.

What is claimed is:

1. A recording and reproducing apparatus comprising at least a hard disk drive unit and a videocassette recorder unit for recording and reproduction onto/from a magnetic tape through a magnetic head and having a structure in which said hard disk drive unit is mounted on a hard disk drive holder via a first shock-absorbing members and said hard disk drive holder is mounted on a main body chassis, wherein said hard disk drive holder is formed of a resin member and comprises a placing plate, said hard disk drive unit being placed and fixed on said placing plate, and leg members provided in an extending manner downward from the corners of said placing plate, bottom surfaces of said leg members being fixed to said main body chassis via second shock-absorbing members, and said hard disk drive unit being held in a floating manner over said placing plate by said first shock-absorbing members.

2. A recording and reproducing apparatus comprising:
at least a hard disk drive unit and a video recorder unit;
a hard disk drive holder comprising a placing plate, wherein said hard disk drive unit is mounted on said hard disk drive holder via first shock-absorbing members said first shock absorbing being located between and contacting said hard disk drive unit and said hard disk drive holder; and
leg members extending from said placing plate and having bottom surfaces fixed to a main body chassis via second shock-absorbing members, said second shock-absorbing members being respectively located between and in contact with said hard disk drive unit and said hard disk drive holder.

3. A recording and reproducing apparatus comprising a hard disk drive unit and having a structure in which said hard disk drive unit is mounted on a hard disk drive holder and held in a floating manner over said placing plate via first shock-absorbing members and said hard disk drive holder is mounted on a main body chassis,
wherein said hard disk drive holder is formed of a resin member,
wherein said hard disk drive holder comprises a placing plate, said hard disk drive unit being placed and fixed on said placing plate, and leg members provided in an extending manner downward from corners of said placing plate, bottom surfaces of said leg members being fixed to said main body chassis, and
wherein second shock-absorbing members are inserted between the bottom surfaces of said leg members and said main body chassis.

4. The recording and reproducing apparatus according to claim 3, further comprising a videocassette recorder unit for recording and reproduction onto/from a magnetic tape through a magnetic head.

5. The recording and reproducing apparatus according to claim 2 wherein the video recorder unit is a videocassette recorder unit for recording and reproduction onto/from a magnetic tape through a magnetic head.

6. The recording and reproducing apparatus according to claim 2 wherein said hard disk drive holder is formed of a resin.

7. The recording and reproducing apparatus according to claim 2 wherein the bottom surfaces of the leg members are planar and have a screw insertion hole extending therethrough and wherein the leg members include two front legs having bottom surfaces which are each surrounded in part by an annular rib.

* * * * *

UNITED STATES PATENT AND TRADEMARK OFFICE
CERTIFICATE OF CORRECTION

PATENT NO. : 7,738,246 B2
APPLICATION NO. : 12/003882
DATED : June 15, 2010
INVENTOR(S) : Hiroaki Iwaasa Page 1 of 1

It is certified that error appears in the above-identified patent and that said Letters Patent is hereby corrected as shown below:

Column 5 Line 58 (claim 1, line 6), delete "a".

Column 6, Line 14 (claim 2, line 5), "members" should read -- members, --.

Column 6, Line 15 (claim 2, line 6), "absorbing" should read -- absorbing members --.

Signed and Sealed this

Twenty-fourth Day of August, 2010

David J. Kappos
*Director of the United States Patent and Trademark Office*